May 27, 1969
R. E. KOSTUR
3,446,096
DRIVE MECHANISM FOR A ROTARY WORK SUPPORT
Filed April 24, 1967
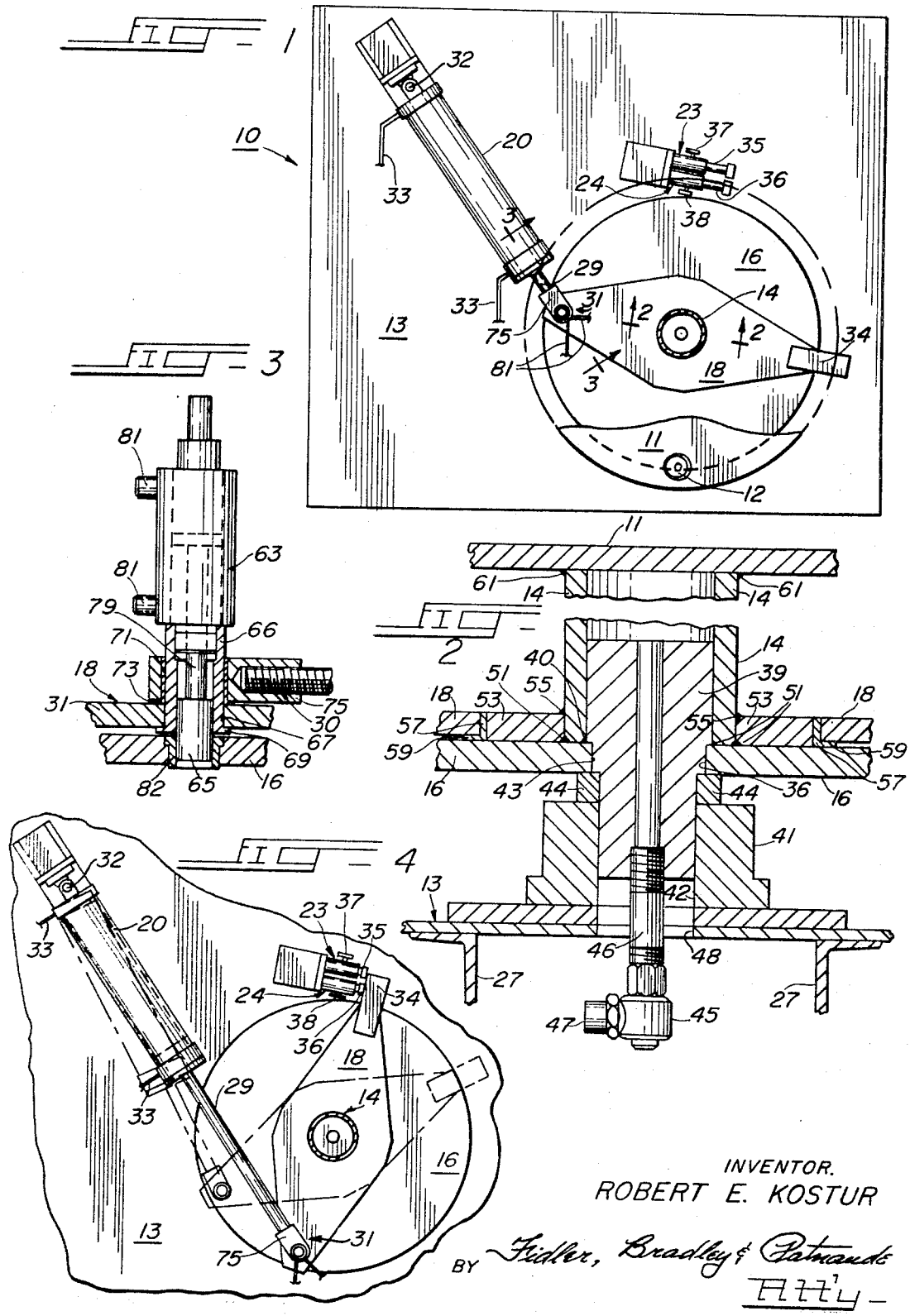
INVENTOR.
ROBERT E. KOSTUR
BY Fidler, Bradley & Patnaude
ATTY

United States Patent Office 3,446,096
Patented May 27, 1969

3,446,096
DRIVE MECHANISM FOR A ROTARY WORK SUPPORT
Robert E. Kostur, Oak Brook, Ill., assignor to Comet Industries, Inc., Bensenville, Ill., a corporation of Illinois
Filed Apr. 24, 1967, Ser. No. 633,080
Int. Cl. B23q 17/00
U.S. Cl. 74—821                                      6 Claims

ABSTRACT OF THE DISCLOSURE

An apparatus for sequentially rotating a work support through a series of work positions includes a frame, a support shaft for the work support, and a rotatably-mounted clevis arm overlying a drive plate on the work support shaft. In use, one end of the clevis arm is detachably connected to the drive plate so that an adjustably-mounted hydraulic piston cylinder assembly can rotate the clevis arm and drive plate in unison through 90° until an opposite end of the clevis arm engages a pair of adjustably-mounted, hydraulic piston-cylinder assemblies which oppose the force produced by the first-mentioned piston-cylinder assembly for smoothly arresting the motion of the drive plate and the work support at a predetermined position. To repeat the cycle, the clevis arm is disconnected from the drive plate and is rotated back to its starting position.

BACKGROUND OF THE INVENTION

This invention relates to a drive mechanism for a rotary work support, and it more particularly relates to a drive mechanism for a rotary work support which sequentially rotates the work support through a series of work positions.

Various different types of work supports have been successfully employed for supporting a series of workpieces and for rotating them from one station to another during the course of a manufacturing process. Each workpiece was supported in its own location or position on the work support so that each workpiece could undergo a different phase of construction. For example, in a thermoforming process for molding plastics and like materials, a plastic sheet was loaded on the first position of the work support so that the first position could then be rotated sequentially to a series of stations for performing the various processing steps such as heating and forming of the plastic. As a result, atfer the first position was rotated from the first loading position, another sheet of plastic would be loaded on the second stage and so on until each stage was supplied with a sheet of plastic so that each position was in operation simultaneously. In the past, when drive mechanisms were employed to sequentially rotate the work supports, various problems were associated with such drive mechanisms, such, for example, as requiring additional indexing mechanisms, and also hunting or bouncing of the work support which occured upon stopping at a given position thereby causing spurious jarring and jolting of the workpieces supported by the work support. Furthermore, the various different types of prior art mechanisms were relatively complex and expensive.

SUMMARY OF THE INVENTION

Therefore, it is the principal object of the present invention to provide a new and improved drive mechanism for a rotary work support.

Another object of the present invention is to provide an economical and efficient drive mechanism for a rotary work support, which drive mechanism sequentially rotates the work support to predetermined positions without causing it to hunt or bounce as it assumes such successive angular positions.

Briefly, the above and further objects are realized in accordance with the present invention by providing a drive hydraulic piston-cylinder assembly for causing a clevis arm and a drive plate for the work support to rotate in unison until the clevis arm engages a pair of adjustably-mounted hydraulic piston-cylinder assemblies, each having a piston for resiliently retracting in opposition to the drive piston-cylinder assembly to smoothly and evenly arrest the motion of the clevis arm and the drive plate to a predetermined position. The position of the piston-cylinder assemblies can be adjusted to cause the drive plate to stop precisely at the next succeeding work position for the work support. After stopping at the new position, the clevis arm may be disconnected from the drive plate so that the drive assembly may then rotate the clevis arm out of engagement with the spring-loaded pistons of the pair of piston-cylinder assemblies to enable them to return to their normal position. The drive piston-cylinder assembly continues to rotate the clevis arm until its piston completely retracts into its cylinder, at which point the clevis arm is located at its starting location so that the cycle of operation may then be repeated.

BRIEF DESCRIPTION OF THE DRAWINGS

These and further objects of the present invention will be understood more fully and completely from the following detailed description when considered with reference to the accompanying sheet of drawings, wherein:

FIGURE 1 is a plan view of a rotary work support assembly with a portion of the work support broken away to disclose the drive mechanism therefor;

FIGURE 2 is an enlarged cross sectional view of FIG. 1 taken substantially along the line 2—2 thereof;

FIGURE 3 is an enlarged cross sectional view of FIG. 1 taken substantially along the line 3—3 thereof; and FIGURE 4 is a plan view of the drive mechanism of FIG. 1 shown in its advanced position.

DESCRIPTION OF THE PREFERRED EMBODIMENTS

Referring now to FIG. 1, there is shown a rotary work support assembly 10 for supporting a series of workpieces, not shown in the drawings, which are individually supported by a series of work position supports, not shown in the drawings, that are circumferentially spaced at intervals about a turntable 11 (shown partially broken away in FIG. 1). One of the work position supports may be secured to the turntable 11 at the point 12 in a manner as described in U.S. Patent 3,192,800. The principal elements of the rotary work support assembly 10 include a frame 13, a vertical support shaft 14 rotatably mounted on the frame 13, a drive plate 16 fixedly mounted on the lower end of shaft 14, an elongated clevis arm 18 rotatably mounted on the shaft 14, a drive means such as the hydraulic piston-cylinder assembly 20 for rotating the drive plate 16 which is detachably connected to one end of the clevis arm 18, and a resilient bumper such as a pair of adjustable hydraulic piston-cylinder assemblies 23 and 24 for arresting the motion of the drive plate 16 and the clevis arm 18, and the circular turntable 11 fixedly mounted on the top end of the shaft 14. In operation as shown in FIGS. 1–4 of the drawings, in order to rotate the turntable 11, the drive piston-cylinder assembly 20 causes the drive plate 16 and the clevis arm 18 to rotate in unison from a starting position, as illustrated, in a counter-clockwise direction, as viewed in FIG. 1, until the opposite end of the clevis arm 18 engages the piston-cylinder assemblies 23 and 24 located less than 360° from the starting position to smoothly and evenly de-accelerate the motion of the clevis arm 18 and hence the motion of the turntable 11. After arriving at the new position engaging the assemblies 23 and 24, the clevis arm 18 is disconnected from the drive plate 16 and thence the drive assembly 20 rotates the clevis arm 18 back to its starting position.

Referring now to FIGS. 1 and 2, the frame 13 is provided with a set of vertical supports 27, which are only partially shown in FIG. 2 and which support the frame 13 on the floor. As shown in FIG. 1, the drive assembly 20 is pivotally mounted on the frame 13, and it includes a piston 29 slidably mounted therein. In order to pivotally connect the piston 29 of the drive assembly 20 to an end 31 of the clevis arm 18, the assembly 20 is pivotally mounted on the frame 13 at pivot point 32 at substantially the same elevation as the clevis arm 18. For the purpose of enabling the piston 29 to rotate the clevis arm 18 back to the starting position, the position of the drive assembly 20 on the frame 13 with respect to the drive plate 16 is adjusted so that when the piston 29 completely retracts within the assembly 20, the clevis arm 18 is then precisely located at its starting position. The assembly 20 is selectively operated by means of conventional control apparatus, not shown in the drawings, which selectively supplies fluid under pressure to the assembly 20 by means of a pair of lines 33 to move the piston 29 reciprocatively.

For the purpose of enabling a stop member 34, which is welded on the opposite end of the clevis arm 18, to engage the piston-cylinder assemblies 23 and 24, the assemblies 23 and 24 are adjustably mounted contiguous to one another on the frame 13 at substantially the same vertical height as the clevis arm 18 at the periphery of the drive plate 16. The piston-cylinder assemblies 23 and 24 have spring-loaded pistons 35 and 36, respectively, which are biased in a normally extended position. In order to cause the drive plate to stop precisely at the next succeeding work position for the work support, the precise location of the assemblies 23 and 24 with respect to the starting position of the clevis arm 18 is adjusted, and also a pair of fluid-control adjustment knobs 37 and 38, respectively, for the assemblies 23 and 24 are preset to cause their pistons 35 and 36 to retract completely into their cylinders while exerting a force on the stop member 34 in opposition to the piston 29, so that the drive plate 16 stops at a predetermined position. Depending upon the number of stations mounted on the turntable 11, the assemblies 23 and 24 may be located at any angular position away from the starting position of the stop member 34 of the clevis arm 18. As illustrated in the drawings, the stop member 34 is located at a distance of about 90° away from the assemblies 23 and 24, and therefore the turntable 11 is rotated through four separate work positions to provide a four-stage rotary work support.

As shown in FIG. 2, for the purpose of rotatably mounting the hollow support shaft 14, a generally cylindrical, hollow-core plug 39 is secured to the bottom portion of the hollow support shaft 14 by any convenient method, such as press fitting, and also by the welds 40 so that a bushing 41 fixedly mounted on the frame 13 and having an axially-aligned cylindrical bore 42 loosely receives the bottom portion of the plug 39. The drive plate 16 is circular in shape (FIG. 1) and is provided with a hole 43 at its center for fixedly receiving the plug 39 at a reduced portion thereof. To enable the cylindrical plug 39 to rotate freely, an annular thrust bearing 44 receives the plug 39 at a further reduced lower portion thereof under the drive plate 16 so that the drive plate 16 rests on top of the thrust bearing 44 and the thrust bearing rests on top of the bushing 41. In order to prevent spurious longitudinal movement of the support shaft 14, a swivel union 45 is rigidly connected to the frame 13 by a pipe 46, only partially shown in the drawings. The swivel union 45 is connected to the bottom portion of the plug 39 by a pipe 47 which extends through an opening 48 in the frame 13 and which is threaded into the bottom end of the plug 39.

The bottom of the shaft 14 rests on the top of the drive plate 16 and is welded thereto by means of the welds 40 and also of welds 51. In order to enable the clevis arm 18 to rotate freely about the vertical support shaft 14, a collar 53 receives the shaft 14 and is secured to the top of the drive plate 16 and to the shaft 14 by means of the welds 51 and 55 so that an annular thrust bearing 57 having a lower outwardly extending flange portion 59 receives the collar 53. The clevis arm 18 receives the thrust bearing 57 and rests on its lower flange portion 59 so that the clevis arm 18 is spaced from the drive plate 16. The turntable 11 is fixedly connected to the top of the shaft 14 by any suitable means such as the welds 61.

Referring to FIG. 3, considering now a mechanism for detachably connecting the end 31 of the clevis arm 18 to the drive plate 16, the mechanism as shown in the drawings includes a hydraulic piston-cylinder assembly 63 mounted on the top of the clevis arm 18 for driving a shotpin 65 toward and away from the drive plate 16. For the purpose of mounting the shotpin assembly 63 onto the clevis arm 18, the bottom portion of the assembly 63 is threaded onto the top end of a hollow cylindrical sleeve 66 which fits into an opening 67 in the clevis arm 18 and which is aligned with and receives the shotpin 65. The sleeve 66 having a lower outwardly extending flange portion 67 is pulled tightly into engagement with the underside of the clevis arm 18 by means of an outer sleeve 71 mounted above the clevis arm 18. For the purpose of rotatably connecting the drive plate-rotating pneumatic drive assembly 20 to the clevis arm 18, a bracket 75 having a bore 77 for loosely receiving the outer sleeve 71 is threaded onto an end 76 of the arm of the piston 29 of the drive assembly 20 so that the bracket 75 rests on the lower flange 73 of the sleeve 71.

The shotpin 65 is driven toward and away from the drive plate 16 by means of a piston 79 slidably mounted within the shotpin assembly 63 under the control of a conventional control apparatus, not shown in the drawings, which selectively supplies fluid under pressure to the assembly 63 by means of a pair of control lines 81. In order to enable the shotpin 65 to engage the drive plate 16, a generally cup-shaped bushing 82 is fixedly secured within an opening in the drive plate 16 for receiving the shotpin 65. The bushing 82 is fixedly secured to the plate 16 by any convenient means such as press-fitting or welding.

OPERATION

In order to rotate the turntable 11 from one work position to another, the shotpin assembly 63 drives the shotpin 65 into its extreme lower position where it engages the bushing 82 of the drive plate 16, thereby detachably connecting the clevis arm 18 to the drive plate 16. Thereafter, the piston 29 of the drive assembly 20 rotates the drive plate 16 and the clevis arm 18 in unison in a counterclockwise direction as viewed in FIG. 1, whereby the drive plate 16 causes the central shaft 14 and the turntable 11 to rotate in the same direction.

As the piston 29 moves extensively in a direction tangential to the periphery of the drive plate 16, the drive assembly 20 pivots about the pivot point 32 so that the drive plate 16 and the clevis arm 18 continue to rotate in unison from the intermediate position shown in broken lines in FIG. 4 until the stop member 34 of the clevis arm 18 moves into engagement with the assemblies 23 and 24 to cause the pistons 35 and 36 to retract. As a result, the assemblies 23 and 24 operate in opposition to the drive assembly 20 to arrest the movement of the stop member 34. At first, the speed of rotation of the clevis arm 18 and the drive plate 16 is rapidly and smoothly reduced. Thereafter, the reduction in the speed of rotation continues in a more gradual manner until the pistons 35 and 36 completely retract within their respective assemblies 23 and 24, before the piston reaches the end of its forward stroke, thereby stopping the clevis arm 18 and the drive plate 16 at the next succeeding work position.

After the motion has stopped, the shotpin assembly 63 retracts the shotpin 65 from the bushing 82 of the drive plate 16 to detach the clevis arm 18 from the drive plate. Whereupon, the piston 29 retracts within the drive assembly 20 to cause the clevis arm 18 to rotate back in a clockwise direction, as viewed in FIGS. 1 and 4, toward its original starting position. As the clevis arm 18 rotates in the clockwise direction away from the assemblies 23 and 24, the spring-loaded pistons 35 and 36 move extensively to their normal positions. The drive assembly 20 continues to rotate the clevis arm 18 until the piston 19 of the assembly 20 completely retracts, at which point the clevis arm 18 is located at its starting position. After the clevis arm 18 arrives at the starting position and after completing the next phase of construction on the workpieces, the cycle of operation may then be repeated.

I claim:
1. A rotary work support assembly for supporting a plurality of workpieces, said assembly having a frame, a support shaft rotatably mounted on the frame for supporting a work support for the workpieces, a drive plate fixedly mounted on the shaft, and a drive mechanism for sequentially rotating the drive plate through a series of work positions, wherein the improvement resides in the drive mechanism, said mechanism comprising:
   an elongated clevis arm having first and second ends and rotatably mounted at a point intermediate its said first and second ends on said shaft adjacent to the drive plate;
   connecting means for detachably connecting said first end of said clevis arm to said drive plate while said clevis arm is located in a starting position;
   drive means fixedly connected to said first end of said clevis arm for rotating said drive plate and said clevis arm in unison from said starting position to a second position located less than 360° from said starting position;
   a resilient bumper mounted on the frame at said second position for engaging said second end of the clevis arm as the clevis arm approaches said second position and for smoothly arresting the motion of said clevis arm and said drive plate to cause said clevis arm and said drive plate to stop at said second position;
   said connecting means for disconnecting said clevis arm from said drive plate while said clevis arm is located in said second position; and
   said drive means for rotating said clevis arm to said starting position after said clevis arm is disconnected from said drive plate.

2. A drive mechanism according to claim 1, wherein said drive means comprises a driving hydraulic piston-cylinder assembly having a cylinder and a piston slidably mounted therein and connected to said end of said clevis arm, and
said resilient bumper includes a bumper hydraulic piston-cylinder assembly adjustably mounted on the frame and having a cylinder and a spring-loaded piston slidably mounted in said bumper cylinder for exerting a force on said clevis arm in opposition to the force exerted by said driving assembly on said clevis arm to smoothly reduce the rotational speed of said clevis arm when said clevis arm engages the bumper piston and subsequently for completely retracting into said bumper cylinder to cause said clevis arm and said drive plate to stop at said predetermined position.

3. A drive mechanism according to claim 2, wherein said driving assembly includes mounting means for pivotally mounting the drive cylinder and drive piston at a predetermined position on said frame to cause said clevis arm to be located at said starting position when said drive piston completely retracts within the drive cylinder upon rotating said clevis arm back to said starting position.

4. A drive mechanism according to claim 2, wherein said resilient bumper further includes a second bumper hydraulic piston cylinder assembly located contiguous to the first-mentioned bumper assembly.

5. A drive mechanism according to claim 2,
   further including a stop member fixedly connected to said second end of said clevis arm for engaging said bumper piston of said bumper assembly.

6. A rotary work support assembly for supporting a plurality of workpieces, said assembly having a frame, a support shaft rotatably mounted on the frame for supporting a work support for the workpieces, a drive plate fixedly mounted on the shaft, and a drive mechanism for sequentially rotating the drive plate through a series of work positions, wherein the improvement resides in the drive mechanism, said mechanism comprising:
   an elongated clevis arm rotatably mounted on said shaft adjacent to the drive plate, said arm having first and second ends;
   drive means fixedly connected to one end of said clevis arm and detachably connected to said drive plate for rotating said drive plate and said clevis arm in unison from a starting position to a second position located less than 360° from said starting position and after becoming disconnected from the drive plate for subsequently rotating said clevis arm to said starting position, said drive means comprising a driving hydraulic piston-cylinder assembly having a cylinder and a piston slidably mounted therein and connected to said end of said clevis arm;
   a resilient bumper mounted on the frame at said second position for engaging the clevis arm as the clevis arm approaches said second position and for smoothly arresting the motion of said clevis arm and said drive plate to cause said clevis arm and said drive plate to stop at said second position, said resilient bumper including a bumper hydraulic piston-cylinder assembly adjustably mounted on the frame and having a cylinder and a spring-loaded piston slidably mounted in said bumper cylinder for exerting a force on said clevis arm in opposition to the force exerted by said driving assembly on said clevis arm to smoothly reduce the rotational speed of said clevis arm when said clevis arm engages the bumper piston and subsequently for completely retracting into said bumper cylinder to cause said clevis arm and said drive plate to stop at said predetermined position;
   a stop member fixedly connected to said second end of said clevis arm for engaging said bumper piston of said bumper assembly; and
   connecting means for connecting said clevis arm to said drive plate while said clevis arm is located in the starting position and for disconnecting said clevis arm from said drive plate while said clevis arm is located in said second position, said connecting means comprising a shotpin and a shotpin hydraulic piston-cylinder assembly mounted on the clevis arm and connected to the shotpin for selectively driving the shotpin into and out of an opening in the drive plate so that the clevis arm may be selectively connected and disconnected from the drive plate.

References Cited

UNITED STATES PATENTS 2,887,905  5/1959  Reynolds ------------ 74—821

2,966,813  1/1961  Squiller ------------- 74—821

FOREIGN PATENTS 814,622  6/1959  Great Britain.

MILTON KAUFMAN, *Primary Examiner.*